(12) United States Patent
Fan et al.

(10) Patent No.: US 11,777,313 B2
(45) Date of Patent: Oct. 3, 2023

(54) UNIT COMMITMENT METHOD CONSIDERING SECURITY REGION OF WIND TURBINE GENERATOR WITH FREQUENCY RESPONSE CONTROL

(71) Applicants: State Grid Qinghai Electric Power Research Institute, Qinghai (CN); Chongqing University, Chongqing (CN); State Grid Qinghai Electric Power Company, Qinghai (CN); State Grid Corporation of China, Beijing (CN)

(72) Inventors: Yue Fan, Qinghai (CN); Senlin Yang, Qinghai (CN); Juan Yu, Chongqing (CN); Xiaoku Yang, Qinghai (CN); Ling Dong, Qinghai (CN); Jun Kang, Qinghai (CN); Maochun Wang, Qinghai (CN); Yongqiang Han, Qinghai (CN); Zhifang Yang, Chongqing (CN); Rui Song, Qinghai (CN); Xuebin Wang, Qinghai (CN); Juelin Liu, Chongqing (CN); Haiting Wang, Qinghai (CN); Xiaokan Gou, Qinghai (CN); Guobin Fu, Qinghai (CN); Chunmeng Chen, Qinghai (CN); Pengsheng Xie, Qinghai (CN); Yanhe Li, Qinghai (CN); Shichang Zhao, Qinghai (CN); Xuan Wang, Qinghai (CN); Ying Liang, Qinghai (CN); Jun Yang, Qinghai (CN); Shujie Zhang, Qinghai (CN); Ming Xiao, Qinghai (CN); Jiatian Gan, Qinghai (CN); Guoqiang Lu, Qinghai (CN); Yujie Ding, Qinghai (CN); Dongning Zhao, Qinghai (CN); Jia Yang, Qinghai (CN); Ke Liu, Qinghai (CN); Shaofei Wang, Qinghai (CN); Yongfei Ma, Qinghai (CN); Jie Zhang, Qinghai (CN); Aizhen Zhu, Qinghai (CN); Kaixuan Yang, Qinghai (CN); Shuxian Yuan, Qinghai (CN)

(73) Assignees: State Grid Qinghai Electric Power Research Institute, Xining (CN); Chongqing University, Chongqing (CN); State Grid Qinghai Electric Power Company, Xining (CN); State Grid Corporation of China, Beijing (CN)

(*) Notice: Subject to any disclaimer, the term of this patent is extended or adjusted under 35 U.S.C. 154(b) by 492 days.

(21) Appl. No.: 17/048,606

(22) PCT Filed: Jul. 14, 2020

(86) PCT No.: PCT/CN2020/101932
§ 371 (c)(1),
(2) Date: Oct. 19, 2020

(87) PCT Pub. No.: WO2021/109579
PCT Pub. Date: Jun. 10, 2021

(65) Prior Publication Data
US 2023/0113872 A1    Apr. 13, 2023

(30) Foreign Application Priority Data
Dec. 4, 2019   (CN) .......................... 201911225185.5

(51) Int. Cl.
*H02J 3/24* (2006.01)
*G05B 17/02* (2006.01)
*H02J 3/38* (2006.01)

(52) U.S. Cl.
CPC .............. *H02J 3/241* (2020.01); *G05B 17/02* (2013.01); *H02J 3/381* (2013.01); *H02J 2300/28* (2020.01)

(58) Field of Classification Search
CPC ........ H02J 3/241; H02J 3/381; H02J 2300/28; H02J 3/46; H02J 3/24; G05B 17/02; Y02E 10/76
See application file for complete search history.

(56) References Cited

U.S. PATENT DOCUMENTS

2018/0254662 A1* 9/2018 Golshani .............. G06Q 50/06
2020/0389024 A1* 12/2020 Vartanian .............. H02J 3/381

FOREIGN PATENT DOCUMENTS

CN 105870962 A 8/2016
CN 110417032 A 11/2019

OTHER PUBLICATIONS

Mancarella et al. Power system security assessment of the future National Electricity Market, Melbourne Energy Institute at the University of Melbourne, Jun. 2017, pp. 1-84 (Year: 2017).*

Chao Qin, Security Region Based Security-Constrained Unit Commitment and Impact Analysis of Wind Farm on Power System, Chinese Doctoral Dissertations Full-text Database, Engineering Science and Technology II, Nov. 15, 2015, ISSN:1674-022X, pp. 27-82.

Ya Fu, Load Frequency Control of Power Systems with Integrated Large Scale of Wind Power, Chinese Master's Theses Full-text Database, Engineering Science and Technology II, Oct. 15, 2012, ISSN:1674-0246, pp. 17-39.

* cited by examiner

*Primary Examiner* — Chad G Erdman

(57) ABSTRACT

The present invention discloses a unit commitment method considering security region of wind turbine generators with frequency response control, and the main steps are: 1) determining security region of wind turbine generators when provides frequency response; 2) based on the security region of the wind turbine generators when provides frequency response, establishing a unit commitment model considering security region of wind turbine generators; and 3) calculating the unit commitment model considering the security region of the wind turbine generators by using mixed-integer linear programming method, and obtaining the operation result of the unit commitment considering the security region of the wind turbine generators with frequency response control. The present invention can be widely used in the setting of frequency response parameters of wind turbine generators dispatched in the prior art and the start-stop and output plans of synchronous generator.

1 Claim, 5 Drawing Sheets

UNIT COMMITMENT METHOD CONSIDERING SECURITY REGION OF WIND TURBINE GENERATOR WITH FREQUENCY RESPONSE CONTROL

FIELD OF THE INVENTION

The present invention relates to the technical filed of electric power system and automation, and specifically is unit commitment method considering security region of wind turbine generators with frequency response control.

BACKGROUND OF THE INVENTION

To achieve low-carbon operation of the power system, renewable energy sources such as wind power and photovoltaics have developed rapidly. However, in traditional control modes, renewable energy sources, such as wind power and photovoltaics are all non-synchronous energy sources. High-penetration non-synchronous energy sources bring major challenges to system frequency security. The low inertia power system is easy to be interfered, which will cause the system frequency drop rapidly after a failure, and seriously threaten the system frequency stability. To ensure the system frequency stability, maintaining a certain amount of synchronous generator is necessary. But it will limit the penetration rate of non-synchronous energy sources, and may lead to the consumption problem of renewable energy sources. Therefore, renewable energy sources are required to undertake the task of providing frequency response. Among renewable energy sources, wind turbine generator is considered as an ideal frequency response provider due to the rotational kinetic energy stored on the rotors. The frequency response control of wind turbine generators can simulate frequency response characteristics of synchronous generator, such as inertial response and primary frequency response. When determining the scheme of unit commitment, the frequency responses of wind turbine generators are expected to reduce the burden of synchronous generator to provide frequency response. However, the ability of wind turbine generators to provide frequency response is restricted by its safe operation requirement. In the frequency-constrained unit commitment model, the safety of wind turbine generators is usually ignored, leading to the overestimation of the frequency response capability of wind turbine generators. Therefore, the unit commitment model considering the safety of wind turbine generators needs further study.

SUMMARY OF THE INVENTION

The purpose of the present invention is to solve the problem in the prior art.

The technical solution adopted to achieve the purpose of the present invention is as follows. Unit commitment method considering security region of wind turbine generator with frequency response control, mainly comprises the following steps.

1) Determining the Security Region of the Wind Turbine Generators when Provides Frequency Response, and the Main Steps are as Follows.

1.1) Establishing an Output Model of Wind Turbine Generators when Provides Frequency Response, Namely:

$$\Delta P_w^{PFR} = K_w \Delta f \text{ and} \tag{1}$$

$$\Delta P_w^{IR} = J_w \frac{d\Delta f}{dt}. \tag{2}$$

In the above formulas, $\Delta P_w^{PFR}$ and $\Delta P_w^{IR}$ respectively represent the primary frequency response and virtual inertia response provided by the wind turbine generators. Frequency response coefficient $K_w = 1/K_{droop-w}$. $K_{droop-w}$ is the droop control parameter of the wind turbine generators in primary frequency response control. $J_w$ is the virtual inertia control parameter of the wind turbine generators. $\Delta f$ is the system frequency deviation, and t refers to time.

1.2) Establishing Constraint Condition of the Rotor Rotational Speed $\omega_r$, Namely:

$$\omega_{min} \leq \omega_r \leq \omega_{max} \tag{3}$$

In the above formulas, $\omega_{min}$ and $\omega_{max}$ respectively are the lowest speed and highest speed of the rotor rotational speed of the wind turbine generators.

1.3) Establishing Constraint Conditions of Wind Power Stability, the Main Steps are as Follows.

1.3.1) Determining the Synchronization Characteristics of the Wind Turbine Generators, Namely:

$$P_E = K_{DL}\omega_r^3 - K_w \Delta f - J_w \frac{d\Delta f}{dt} \text{ and} \tag{4}$$

$$P_E = P_M = 0.5\rho\pi R^2 C_P(\beta, \lambda)v^3. \tag{5}$$

In the above formulas, $P_E$ is the active output of the wind turbine generators. $K_{DL}$ is the de-load factor of the wind turbine generators. When the wind turbine generators are working at maximum power tracking mode, the coefficient $K_{DL}$ is the maximum power tracking coefficient, and $K_{DL}\omega_r^3$ is the output of the wind turbine generators when there is no virtual inertia response. $\rho$ is the air density. R is the diameter of the rotor of the wind turbine generators. $v$ is the wind speed. $C_p$ is the power coefficient of the wind turbine generators. $P_M$ is the mechanical power of the wind turbine generators. $\beta$ is the pitch angle of the wind turbine generators.

Wherein, the tip speed ratio $\lambda$ is shown as follows.

$$\lambda = \frac{R\omega_r}{v} \tag{6}$$

1.3.2) Determining the limit operating rotational speed $\omega_{rc}$ of the wind turbine generators. The limit operating rotational speed $\omega_{rc}$ of the wind turbine generators meets the following formula.

$$\frac{\partial\left(K_{DL}\omega_r^3 - K_w\Delta f - J_w\frac{d\Delta f}{dt}\right)}{\partial\omega_r} = \frac{\partial\left(0.5\rho\pi R^2 C_p\left(\beta, \frac{R\omega_r}{v}\right)v^3\right)}{\partial\omega_r} \tag{7}$$

1.3.3) Substituting the limit operating rotational speed $\omega_{rc}$ of the wind turbine generators into formula (5), calculating to obtain the limit operating point of the wind turbine generators $$\left(\omega_{rc}, 0.5\rho\pi R^2 C_P\left(\beta, \frac{R\omega_{rc}}{v}\right)v^3\right).$$

1.3.4) Connecting the extreme operating points at each wind speed to form the stability boundary of the wind turbine generators, and substituting formula (6) into formula (7) to calculate the limit tip speed ratio A. The limit tip speed ratio A meets the following formula.

$$3K_{DL}\left(\frac{\lambda v}{R}\right)^2 = 0.5\rho\pi R^2 \frac{\partial(C_P(\beta,\lambda))}{\partial \frac{\lambda v}{R}} v^3 = 0.5\rho\pi R^3 \frac{\partial(C_P(\beta,\lambda))}{\partial \lambda} v^2 \quad (8)$$

1.3.5) Establishing the expression formula of the relationship between wind speed and rotor rotational speed on the stability boundary of the wind turbine generators, namely:

$$v = \frac{R\omega_r}{\lambda_c}. \quad (9)$$

1.3.6) Substituting formula (9) into formula (5), and calculating to obtain the expression formula of the stability boundary of the wind turbine generators, namely:

$$P_c = \frac{0.5\rho\pi R^5 C_P(\beta,\lambda_c)}{\lambda_c^3}\omega_r^3 = K_c\omega_r^3. \quad (10)$$

1.3.7) Based on formula (10), updating the limit operating point of the wind turbine generators to ($\omega_{rc}$, $K_c\omega_r^3$).

1.3.8) Establishing the stability constraints of the wind turbine generators when provides frequency response, and it is divided into the following three situations.

I) When the wind turbine generators are operating at the lowest speed, the wind turbine generators do not provide frequency response. The frequency response of the wind turbine generators is as follows.

$$-K_w\Delta f - J_w\frac{d\Delta f}{dt} = 0 \quad \omega_{r0} < \omega_{min} \quad (11)$$

In the above formulas, $\omega_{r0}$ is the rotor rotational speed in the initial operating state of the wind turbine generators.

II) When the limit operating rotational speed $\omega_{rc}$ is less than the lowest speed $\omega_{min}$, the stability constraints of the wind turbine generators when provides frequency response are as follows.

$$K_{DL}\omega_{min}^3 - K_w\Delta f - J_w\frac{d\Delta f}{dt} \le f_M(\omega_{min}) \quad \omega_{rc} < \omega_{min} \quad (12)$$

In the above formulas, $f_M(\omega_{min})$ is the mechanical power of the wind turbine generators at the lowest rotational speed comm.

III) When $\omega_{rc} \ge \omega_{min}$, the stability constraints of the wind turbine generators when provides frequency response are as follows.

$$K_{DL}\omega_{rc}^3 - K_w\Delta f - J_w\frac{d\Delta f}{dt} \le K_c\omega_{rc}^3 \quad (13)$$

1.4) Establishing the output constraints of the wind turbine generators when provides frequency response, and the main steps are as follows.

1.4.1) Updating the active output $P_E^*$ of the wind turbine generators, namely:

$$P_E^* = (1-d_w)P_w - K_w\Delta f - J_w\frac{d\Delta f}{dt}. \quad (14)$$

In the above formulas, $P_w$ is the available power of the wind turbine generators. $d_w$ is the reserve coefficient of the wind turbine generators, and $(1-d_w)P_w$, is the actual output of the wind turbine generators when does not provide frequency response output.

1.4.2) Establishing the output constraints of the wind turbine generators when provides frequency response, namely:

$$(1-d_w)P_w - K_w\Delta f - J_w\frac{d\Delta f}{dt} \le P_w^{max}. \quad (15)$$

In the above formulas, $P_w^{max}$ is the maximum output of wind turbine generators.

1.5) Combining formula (10), formula (12), formula (13) and formula (15), the security region of the wind turbine generators meets formula (16) to formula (19), namely:

$$K_w = 0; J_w = 0 \quad \omega_{r0} < \omega_{min}; \quad (16)$$

$$-K_w\Delta f - J_w\frac{d\Delta f}{dt} \le f_M(\omega_{min}) - K_{DL}\omega_{min}^3 \quad \omega_{rc} < \omega_{min}; \quad (17)$$

$$-K_w\Delta f - J_w\frac{d\Delta f}{dt} \le K_c\omega_{rc}^3 - K_{DL}\omega_{rc}^3 \quad \omega_{rc} \ge \omega_{min}; \text{ and} \quad (18)$$

$$-K_w\Delta f - J_w\frac{d\Delta f}{dt} \le P_w^{max} - (1-d_w)P_w. \quad (19)$$

2) Based on the security region of the wind turbine generators when provides frequency response, establishing a unit commitment model considering the security region of the wind turbine generators. The main steps are as follows.

2.1) With the goal of minimizing the operating cost of the traditional synchronous generator, establishing the objective function, namely:

$$\min \sum_{i=1}^{T}\sum_{g\in\zeta}\left[(c_g P_{g,i} + c_g^{nl} N_{g,i}^{on})\Delta t + c_g^{su} N_{g,i}^{su}\right]. \quad (20)$$

In the above formulas, c is a set of traditional synchronous generators. $c_g$ is the marginal cost. $c_g^{nl}$ is the no-load cost. $c_g^{su}$ is the start-up cost. $P_{g,i}$ is the active power of the traditional synchronous generator. $N_{g,i}^{on}$ is an online synchronous generator. $N_{g,i}^{su}$ is the synchronous generator turned on at step i. T is the total optimization time scale. $\Delta t$ is the unit time interval. Variables with the subscript i represent the variables of the i-th step. Variables with subscript g represent variables related to traditional synchronous generator g. Variables with subscripts g,i represent the related variables of the traditional synchronous generator g at the i-th step.

2) Establishing constraints of traditional unit commitment, which include power flow constraints, synchronous generator constraints, system frequency stability constraints, frequency change rate constraints, frequency lowest point constraints, and wind turbine generators security region constraints.

2.2.1) Power flow constraints are as follows.

$$\sum_{g \in \zeta} P_{g,i} + \sum_{w \in W} (1 - d_{w,i}) P_{w,i} = L_i \quad i \in T \tag{21}$$

In the above formulas, W is a set of wind turbine generators. $L_i$ is the total load of the system. The wind turbine generators parameters are all aggregate parameters. Variables with subscript w represent variables related to wind turbine generators w. Variables with subscripts w,i represent related variables of wind turbine generators w at step i.

2.2.2) Synchronous generator constraints are shown in formula (22) to formula (28).

$$N_{g,i}^{on} P_g^{min} \leq P_{g,i} \leq N_{g,i}^{on} P_g^{max} \tag{22}$$

$$N_{g,i}^{on} = N_{g,i-1}^{on} + N_{g,i}^{su} - N_{g,i}^{sd} \tag{23}$$

$$N_{g,i}^{off} = N_{g,i-1}^{off} + N_{g,i}^{sd} - N_{g,i}^{su} \tag{24}$$

$$P_{g,i} - P_{g,i-1} \leq \Delta P_g^{max} N_{g,i-1}^{on} + \Delta P_g^{su\,max} (N_{g,i}^{on} - N_{g,i-1}^{on}) \tag{25}$$

$$P_{g,i} - P_{g,i-1} \geq -\Delta P_g^{max} N_{g,i}^{on} + \Delta P_g^{sd\,max} (N_{g,i-1}^{on} - N_{g,i}^{on}) \tag{26}$$

$$\sum_{k=i+1-\Delta t_g^{up}}^{i} N_{g,k}^{su} \leq N_{g,i}^{on} \tag{27}$$

$$\sum_{k=i+1-\Delta t_g^{dw}}^{i} N_{g,k}^{sd} \leq N_{g,i}^{off} \tag{28}$$

In the above formulas, $P_g^{min}$ and $P_g^{max}$ are the minimum value and maximum value of the synchronous generator output, respectively. $\Delta P_g^{max}$ is the maximum value of the output change of the synchronous generator. $\Delta P_g^{su\,max}$ and $\Delta P_g^{sd\,max}$ are the maximum upward and downward climbing power of the synchronous generator, respectively. $N_{g,i}^{sd}$ is the number of synchronous generators shut down in the step i. $N_{g,i}^{off}$ is the number of synchronous generators offline at step i. $\Delta t_g^{up}$ and $\Delta t_g^{dw}$ are the minimum start and stop time of the unit. $i \in T$. $g \in \zeta$ 2.2.3) The system frequency stability constraints are as follows.

$$2H_i \frac{d\Delta f}{dt} + (D_i L_i + K_i) \Delta f = -\Delta L_i \tag{29}$$

Wherein, $D_i$ is the load damping coefficient. $H_i$ is the system inertia time constant. $K_i$ is the frequency response coefficient.

Wherein, the system inertia time constant $H_i$ is shown as follows.

$$H_i = \frac{\sum_{g \in \zeta} H_g P_g^{max} N_{g,i}^{on}}{f_0} + \pi \sum_{w \in W} J_{w,i} \tag{30}$$

In the above formulas, $H_g$ is the inertia time coefficient of synchronous generator. The optimized variables in formula (30) are the virtual inertia control parameters $J_{w,i}$ of the online synchronous generator $N_{g,i}^{on}$ and the wind turbine generators at i-th step. $f_0$ is the reference frequency of the power system.

Frequency response coefficient $K_i$ is shown as follows.

$$K_i = \frac{\sum_{g \in \zeta} K_g P_g^{max} N_{g,i}^{on}}{f_0} + 2\pi \sum_{w \in W} K_{w,i} \tag{31}$$

In the above formulas, $K_g = 1/K_{droop-g}$. $K_{droop-g}$ is the droop control parameter of the synchronous generator. The optimized variables in formula (31) are the frequency response parameter $K_{w,i}$ of the online synchronous generator $N_{g,i}^{on}$ and the wind turbine generators at the i-th step.

System frequency deviation $\Delta f$ is shown as follows.

$$\Delta f(t) = \frac{\left(e^{-\frac{(D_i L_i + K_i)}{2H_i} t} - 1\right) \Delta L_i}{(D_i L_i + K_i)} \tag{32}$$

Frequency change rate $d\Delta f/dt$ is shown as follows.

$$\frac{d\Delta f(t)}{dt} = -\frac{\Delta L_i}{2H_i} e^{-\frac{(D_i L_i + K_i)}{2H_i} t} \tag{33}$$

2.2.4) Frequency change rate constraints are shown as follows.

$$\left|\left(\frac{d\Delta f(t)}{dt}\right)\right| \leq \frac{\Delta L_i}{2H_i} \leq \left(\frac{d\Delta f}{dt}\right)_{max} \tag{34}$$

2.2.5) Frequency lowest point constraints are shown as follows.

$$|\Delta f(t)| \leq |\Delta f_{nadir,i}| = \frac{\Delta L_i}{(D_i L_i + K_i)} \leq \Delta f_{max} \tag{35}$$

2.2.6) Based on formula (1), formula (2), formula (32) to formula (35), establishing the equation of frequency response provided by the wind turbine generators, namely:

$$-K_{w,i} \Delta f(t) - J_{w,i} \frac{d\Delta f(t)}{dt} = \tag{36}$$

$$-K_{w,i} \frac{\left(e^{-\frac{(D_i L_i + K_i)}{2H_i} t} - 1\right) \Delta L_i}{(D_i L_i + K_i)} + J_{w,i} \frac{\Delta L_i}{2H_i} e^{-\frac{(D_i L_i + K_i)}{2H_i} t} =$$

$$\left(-\frac{K_{w,i} \Delta L_i}{(D_i L_i + K_i)} + \frac{J_{w,i} \Delta L_i}{2H_i}\right) e^{-\frac{(D_i L_i + K_i)}{2H_i} t} + \frac{K_{w,i} \Delta L_i}{(D_i L_i + K_i)} \leq$$

$$\max\left\{\frac{K_{w,i} \Delta L_i}{(D_i L_i + K_i)}, \frac{J_{w,i} \Delta L_i}{2H_i}\right\} \leq \max\left\{K_{w,i} \Delta f_{max}, J_{w,i} \left(\frac{d\Delta f}{dt}\right)_{max}\right\}.$$

2.2.7) Substituting formula (36) into formula (17) to formula (19) to establish the security region constraints of the wind turbine generators, which are shown as formula (37) to formula (43) respectively.

$$K_w = 0; J_w = 0 \quad \omega_{r0} < \omega_{min} \tag{37}$$

-continued $$K_{w,i}\Delta f_{max} \leq f_M(\omega_{min}) - K_{DL}\omega_{min}^3 \quad \omega_{rc} < \omega_{min} \tag{38}$$

$$J_{w,i}\left(\frac{d\Delta f}{dt}\right)_{max} \leq f_M(\omega_{min}) - K_{DL}\omega_{min}^3 \quad \omega_{rc} < \omega_{min} \tag{39}$$

$$K_{w,i}\Delta f_{max} \leq K_c\omega_{rc}^3 - K_{DL}\omega_{rc}^3 \quad \omega_{rc} \geq \omega_{min} \tag{40}$$

$$J_{w,i}\left(\frac{d\Delta f}{dt}\right)_{max} \leq K_c\omega_{rc}^3 - K_{DL}\omega_{rc}^3 \quad \omega_{rc} \geq \omega_{min} \tag{41}$$

$$K_{w,i}\Delta f_{max} \leq P_w^{max} - (1 - d_{w,i})P_{w,i} \tag{42}$$

$$J_{w,i}\left(\frac{d\Delta f}{dt}\right)_{max} \leq P_w^{max} - (1 - d_{w,i})P_{w,i} \tag{43}$$

3) Calculating the unit commitment model considering the security region of the wind turbine generators by using mixed-integer linear programming method, to obtain the operation result of the unit commitment considering the wind turbine generators security region with frequency response control.

It is worth noting that the present invention considers the synchronization stability of the wind turbine generators, derives the stability constraints of the wind turbine generators, and provides a calculable quantitative expression. Combining the rotational speed constraints and output constraints of the wind turbine generators, jointly characterize the security region of the wind turbine generators when provides frequency response. Then, according to the characteristics of the wind turbine generators when provides frequency response (inertia response and primary frequency response), combined with the system frequency constraints, linearize the security region of the wind turbine generators when provides frequency response, and introduce the linearized security region into the unit commitment model considering frequency constraints. Thus, it can be ensured that the unit commitment model proposed by the present invention can simultaneously meet the system frequency constraints and the security region constraints of the wind turbine generators. The frequency response of the wind turbine generators obtained based on the present invention can guide the setting of the frequency response control parameter of the wind turbine generators.

The technical effect of the present invention is beyond doubt. The present invention has the following effects.

1) The security region of the wind turbine generators when provides frequency response proposed by the present invention, can effectively guide the setting of the frequency response control parameters of the wind turbine generators, ensure the safe and stable operation of the wind turbine generators when provides frequency response, and take into account the stability of the system frequency and the safety of the wind turbine generators.

2) The present invention considers both the system frequency stability constraints and the wind turbine generator's own safety constraints in the unit commitment model. When performing unit dispatch, based on the safe and stable operation of the wind turbine generators can be ensured, the wind turbine generators can provide frequency response for the system, support system frequency stability, reduce the burden of synchronous generator to support frequency stability, and save system operating costs.

The present invention can be widely used in the setting of frequency response parameters of wind turbine generators dispatched in the prior art and the start-stop and output plans of synchronous generator.

DETAILED DESCRIPTION OF THE INVENTION

Figure 1:
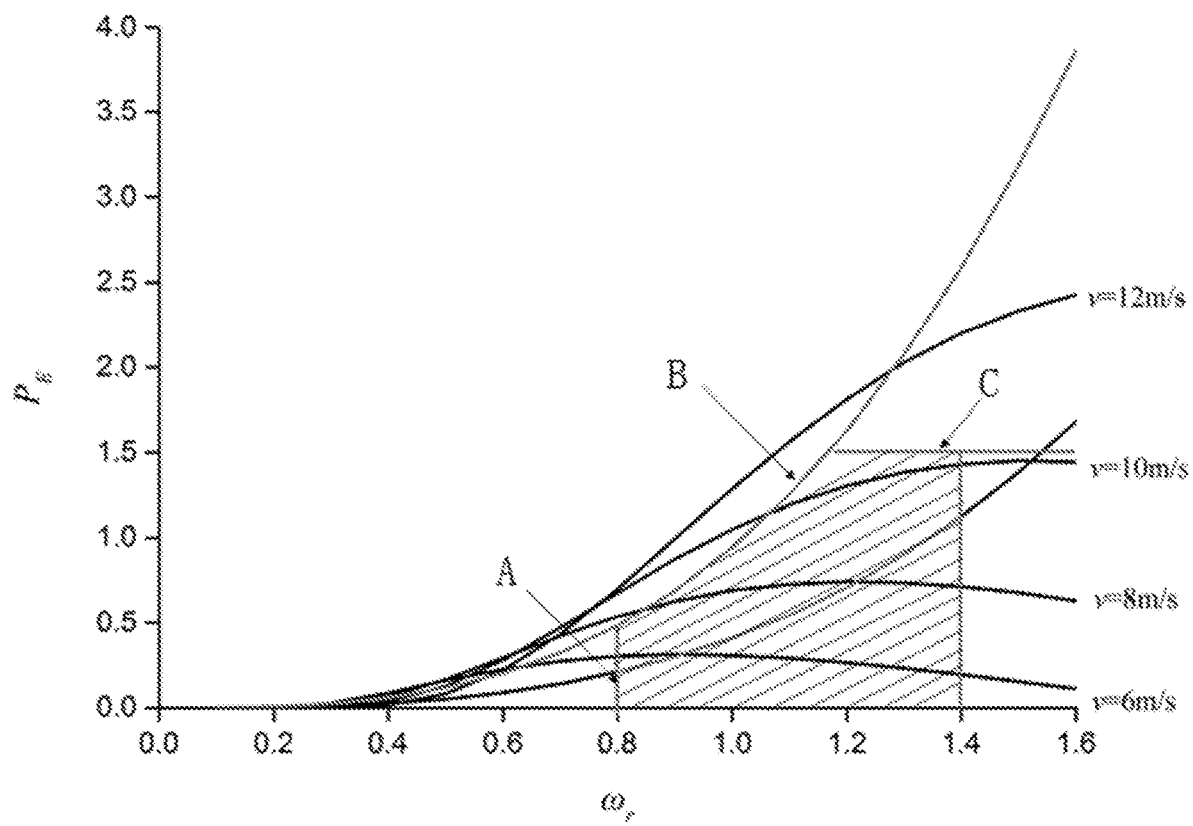
FIG. 1 is a schematic diagram of the security region of the wind turbine generators when provides frequency response.

The present invention will be further described below in conjunction with embodiments, but it should not be understood that the scope of the above subject matter of the present invention is limited to the following embodiments. Without departing from the above-mentioned technical idea of the present invention, various substitutions and changes based on common technical knowledge and conventional means in the field shall be included in the protection scope of the present invention.

Embodiment 1

Refer to FIG. 1 to FIG. 5, the unit commitment method considering security region of wind turbine generators with frequency response control, mainly comprises the following steps.

1) Determining the security region of the wind turbine generators when provides frequency response, and the main steps are as follows.

1.1) Establishing an output model of wind turbine generators when provides frequency response, namely:

$$\Delta P_w^{PFR} = K_w\Delta f \text{ and} \tag{1}$$

$$\Delta P_w^{IR} = J_w\frac{d\Delta f}{dt}. \tag{2}$$

In the above formulas, $\Delta P_w^{PFR}$ and $\Delta P_w^{IR}$ respectively represent the primary frequency response and virtual inertia response provided by the wind turbine generators. Frequency response coefficient $K_w = 1/K_{droop\text{-}w}$. $K_{droop\text{-}w}$ is the droop control parameter of the wind turbine generators in primary frequency response control. $J_w$ is the virtual inertia control parameter of the wind turbine generators. $\Delta f$ is the system frequency deviation, and t refers to time.

1.2) Establishing constraint condition of the rotor rotational speed $\omega_r$, namely:

$$\omega_{min} \leq \omega_r \leq \omega_{max} \tag{3}$$

In the above formulas, $\omega_{min}$ and $\omega_{max}$ respectively are the lowest speed and highest speed of the rotor rotational speed of the wind turbine generators.

1.3) Establishing constraint conditions of wind power stability, the main steps are as follows.

1.3.1) Determining the synchronization characteristics of the wind turbine generators, namely:

$$P_E = K_{DL}\omega_r^3 - K_w\Delta f - J_w\frac{d\Delta f}{dt} \text{ and} \tag{4}$$

$$P_E = P_M = 0.5\rho\pi R^2 C_P(\beta, \lambda)v^3. \tag{5}$$

In the above formulas, $P_E$ is the active output of the wind turbine generators. $K_{DL}$ is the de-load factor of the wind turbine generators. When the wind turbine generators are working at maximum power tracking mode, the coefficient $K_{DL}$ is the maximum power tracking coefficient, and $K_{DL}\omega_r^3$ is the output of the wind turbine generators when there is no virtual inertia response. $\rho$ is the air density. R is the diameter of the rotor of the wind turbine generators. v is the wind speed. $C_p$ is the power coefficient of the wind turbine generators. $P_M$ is the mechanical power of the wind turbine generators. $\beta$ is the pitch angle of the wind turbine generators.

Wherein, the tip speed ratio $\lambda$ is shown as follows.

$$\lambda = \frac{R\omega_r}{v} \tag{6}$$

1.3.2) At a certain wind speed, the stability condition of the wind turbine generator is that the curve of formula (4) and the curve of formula (5) have at least one intersection, otherwise the wind turbine generators may lose its balance point and cause instability. Therefore, the stability limit of the wind turbine generators is that the curve of formula (4) and the curve of formula (5) have one and only one intersection point, which is the tangent point of the curve of formula (4) and the curve of formula (5). Therefore, the limit operating speed $\omega_{rc}$ of the wind turbine generators is calculated by deriving formula (4) and formula (5).

$$\frac{\partial \left(K_{DL}\omega_r^2 - K_w\Delta f - J_w\frac{d\Delta f}{dt}\right)}{\partial \omega_r} = \frac{\partial \left(0.5\rho\pi R^2 C_P\left(\beta, \frac{R\omega_r}{v}\right)v^3\right)}{\partial \omega_r} \tag{7}$$

1.3.3) Substituting the limit operating rotational speed $\omega_{rc}$ of the wind turbine generators into formula (5), calculating to obtain the limit operating point of the wind turbine generators $$\left(\omega_{rc}, 0.5\rho\pi R^2 C_P\left(\beta, \frac{R\omega_{rc}}{v}\right)v^3\right).$$

Connecting the extreme operating points at each wind speed to form the stability boundary of the wind turbine generators, and substituting formula (6) into formula (7) to calculate the limit tip speed ratio $\lambda_c$. The limit tip speed ratio $\lambda_c$ meets the following formula.

$$3K_{DL}\left(\frac{\lambda v}{R}\right)^2 = 0.5\rho\pi R^2 \frac{\partial (C_P(\beta, \lambda))}{\partial \frac{\lambda v}{R}} v^3 = 0.5\rho\pi R^3 \frac{\partial (C_P(\beta, \lambda))}{\partial \lambda} v^2 \tag{8}$$

1.3.5) Establishing the expression formula of the relationship between wind speed and rotor rotational speed on the stability boundary of the wind turbine generators, namely:

$$v = \frac{R\omega_r}{\lambda_c}. \tag{9}$$

1.3.6) Substituting formula (9) into formula (5), and calculating to obtain the expression formula of the stability boundary of the wind turbine generators, namely:

$$P_c = \frac{0.5\rho\pi R^5 C_P(\beta, \lambda_c)}{\lambda_c^3}\omega_r^3 = K_c\omega_r^3. \tag{10}$$

1.3.7) Based on formula (10), updating the limit operating point of the wind turbine generators to $(\omega_{rc}, K_c\omega_r^3)$.

1.3.8) Establishing the stability constraints of the wind turbine generators when provides frequency response, and it is divided into the following three situations.

I) When the wind turbine generator is operating at the lowest speed, the wind turbine generator does not provide frequency response. The frequency response of the wind turbine generator is as follows.

$$-K_w\Delta f - J_w\frac{d\Delta f}{dt} = 0 \;\; \omega_{r0} < \omega_{min} \tag{11}$$

In the above formulas, $\omega_{r0}$ is the rotor rotational speed in the initial operating state of the wind turbine generators.

II) When the limit operating rotational speed $\omega_{rc}$ is less than the lowest speed $\omega_{min}$, the stability constraints of the wind turbine generators when provides frequency response are as follows.

$$K_{DL}\omega_{min}^3 - K_w\Delta f - J_w\frac{d\Delta f}{dt} \leq f_M(\omega_{min}) \;\; \omega_{rc} < \omega_{min} \tag{12}$$

In the above formulas, $F_M(\omega_{min})$ is the mechanical power of the wind turbine generators at the lowest rotational speed $\omega_{min}$.

III) When $\omega_{rc} \geq \omega_{min}$, the stability constraints of the wind turbine generators when provides frequency response are as follows.

$$K_{DL}\omega_{rc}^3 - K_w\Delta f - J_w\frac{d\Delta f}{dt} \leq K_c\omega_{rc}^3 \tag{13}$$

1.4) Establishing the output constraints of the wind turbine generators when provides frequency response, and the main steps are as follows.

1.4.1) Updating the active output $P_E^*$ of the wind turbine generators, namely:

$$P_E = (1 - d_w)P_w - K_w\Delta f - J_w\frac{d\Delta f}{dt}. \tag{14}$$

In the above formulas, $P_w$ is the available power of the wind turbine generators. $d_w$ is the reserve coefficient of the wind turbine generators, and $(1-d_w)P_w$ is the actual output of the wind turbine generators when does not provide frequency response output.

1.4.2) Establishing the output constraints of the wind turbine generators when provides frequency response, namely:

$$(1 - d_w)P_w - K_w\Delta f - J_w\frac{d\Delta f}{dt} \leq P_w^{max}. \tag{15}$$

In the above formulas, $P_w^{max}$ is the maximum output of wind turbine generators.

1.5) Combining formula (10), formula (12), formula (13) and formula (15), the security region of the wind turbine generators meets formula (16) to formula (19), namely:

$$K_w = 0; J_w = 0 \quad \omega_{r0} < \omega_{min}; \tag{16}$$

$$-K_w \Delta f - J_w \frac{d\Delta f}{dt} \leq f_M(\omega_{min}) - K_{DL}\omega_{min}^3 \quad \omega_{rc} < \omega_{min}; \tag{17}$$

$$-K_w \Delta f - J_w \frac{d\Delta f}{dt} \leq K_c \omega_{rc}^3 - K_{DL}\omega_{rc}^3 \quad \omega_{rc} \geq \omega_{min}; \text{ and} \tag{18}$$

$$-K_w \Delta f - J_w \frac{d\Delta f}{dt} \leq P_w^{max} - (1-d_w)P_w. \tag{19}$$

2) Based on the security region of the wind turbine generators when provides frequency response, establishing a unit commitment model considering the security region of the wind turbine generators. The main steps are as follows.

2.1) With the goal of minimizing the operating cost of the traditional synchronous generator, establishing the objective function, namely:

$$\min \sum_{i=1}^{T} \sum_{g \in \zeta} \left[ (c_g P_{g,i} + c_g^{nl} N_{g,i}^{on}) \Delta t + c_g^{su} N_{g,i}^{su} \right]. \tag{20}$$

In the above formulas, $\zeta$ is a set of traditional synchronous generators. $c_g$ is the marginal cost. $c_g^{nl}$ is the no-load cost. $c_g^{su}$ is the start-up cost. $P_{g,i}$ is the active power of the traditional synchronous generator. $N_{g,i}^{on}$ is an online synchronous generator. $N_{g,i}^{su}$ is the synchronous generator turned on at step i. T is the total optimization time scale. $\Delta t$ is the unit time interval. Variables with the subscript i represent the variables of the i-th step. Variables with subscript g represent variables related to traditional synchronous generator g. Variables with subscripts g,i represent the related variables of the traditional synchronous generator g at the i-th step.

2) Establishing constraints of traditional unit commitment, which include power flow constraints, synchronous generator constraints, system frequency stability constraints, frequency change rate constraints, frequency lowest point constraints, and wind turbine generators security region constraints.

2.2.1) Power flow constraints are as follows.

$$\sum_{g \in \zeta} P_{g,i} + \sum_{w \in W}(1-d_{w,i})P_{w,i} = L_i \quad i \in T \tag{21}$$

In the above formulas, W is a set of wind turbine generators. $L_i$ is the total load of the system. The wind turbine generators parameters are all aggregate parameters. Variables with subscript w represent variables related to wind turbine generators w. Variables with subscripts w,i represent related variables of wind turbine generators w at step i.

2.2.2) Synchronous generator constraints are shown in formula (22) to formula (28).

$$N_{g,i}^{on} P_g^{min} \leq P_{g,i} \leq N_{g,i}^{on} P_g^{max} \tag{22}$$

$$N_{g,i}^{on} = N_{g,i-1}^{on} + N_{g,i}^{su} - N_{gj}^{sd} \tag{23}$$

$$N_{g,i}^{on} = N_{g,i-1}^{on} + N_{g,i}^{su} - N_{9j}^{sd} \tag{24}$$

$$P_{g,i} - P_{g,i-1} \leq \Delta P_g^{max} N_{g,i-1}^{on} + \Delta P_g^{sumax}(N_{g,i}^{on} - N_{g,i-1}^{on}) \tag{25}$$

$$P_{g,i} - P_{g,i-1} \geq -\Delta P_g^{max} N_{g,i}^{on} + \Delta P_g^{sdmax}(N_{g,i}^{on} - N_{g,i-1}^{on}) \tag{26}$$

$$\sum_{k=i+1-\Delta t_g^{up}}^{i} N_{g,k}^{su} \leq N_{g,i}^{on} \tag{27}$$

$$\sum_{k=i+1-\Delta t_g^{dw}}^{i} N_{g,k}^{sd} \leq N_{g,i}^{off} \tag{28}$$

In the above formulas, $P_g^{min}$ and $P_g^{max}$ are the minimum value and maximum value of the synchronous generator output, respectively. $\Delta P_g^{max}$ is the maximum value of the output change of the synchronous generator. $\Delta P_g^{su\ max}$ and $\Delta P_g^{sd\ max}$ are the maximum upward and downward climbing power of the synchronous generator, respectively. $N_{g,i}^{sd}$ is the number of synchronous generators shut down in step i. $N_{g,i}^{off}$ is the number of synchronous generators offline at step i. $\Delta t_g^{up}$ and $\Delta t_g^{dw}$ are the minimum start and stop time of the unit. $i \in T$. $g \in \zeta$.

2.2.3) The system frequency stability constraints are as follows.

$$2H_i \frac{d\Delta f}{dt} + (D_i L_i + K_i)\Delta f = -\Delta L_i \tag{29}$$

Wherein, $D_i$ is the load damping coefficient. $H_i$ is the system inertia time constant. $K_i$ is the frequency response coefficient.

Wherein, the system inertia time constant $H_i$ is shown as follows.

$$H_i = \frac{\sum_{g \in \zeta} H_g P_g^{max} N_{g,i}^{on}}{f_0} + \pi \sum_{w \in W} J_{w,i} \tag{30}$$

In the above formulas, $H_g$ is the inertia time coefficient of synchronous generator. The optimized variables in formula (30) are the virtual inertia control parameters $J_{w,i}$ of the online synchronous generator $N_{g,i}^{on}$ and the wind turbine generators at i-th step. $f_0$ is the reference frequency of the power system.

The frequency response coefficient $K_i$ controlled by the P-f of the synchronous generator and wind turbine generators is shown as follows.

$$K_i = \frac{\sum_{g \in \zeta} K_g P_g^{max} N_{g,i}^{on}}{f_0} + 2\pi \sum_{w \in W} K_{w,i} \tag{31}$$

In the above formulas, $K_g = 1/K_{droop-g}$. $K_{droop-g}$ is the droop control parameter of the synchronous generator. The optimized variables in formula (31) are the frequency response parameter $K_{w,i}$ of the online synchronous generator $N_{g,i}^{on}$ and the wind turbine generators at the i-th step.

System frequency deviation $\Delta f$ is shown as follows.

$$\Delta f(t) = \frac{\left(e^{-\frac{(D_i L_0 + K_i)}{2H_i}t} - 1\right)\Delta L_i}{(D_i L_i + K_i)} \quad (32)$$

Frequency change rate $d\Delta f/dt$ is shown as follows.

$$\frac{d\Delta f(t)}{dt} = -\frac{\Delta L_i}{2H_i}e^{\frac{(D_i L_i + K_i)}{2H_i}t} \quad (33)$$

2.2.4) Frequency change rate constraints are shown as follows.

$$\left|\left(\frac{d\Delta f(t)}{dt}\right)\right| \leq \frac{\Delta L_i}{2H_i} \leq \left(\frac{d\Delta f}{dt}\right)_{max} \quad (34)$$

2.2.5) Frequency lowest point constraints are shown as follows.

$$|\Delta f(t)| \leq |\Delta f_{nadir,i}| = \frac{\Delta L_i}{(D_i L_i + K_i)} \leq \Delta f_{max} \quad (35)$$

2.2.6) Based on formula (1), formula (2), formula (32) to formula (35), establishing the equation of frequency response provided by the wind turbine generators, namely:

$$-K_{w,i}\Delta f(t) - J_{w,i}\frac{d\Delta f(t)}{dt} = \quad (36)$$

$$-K_{w,i}\frac{\left(e^{-\frac{(D_i L_i + K_i)}{2H_i}t} - 1\right)\Delta L_i}{(D_i L_i + K_i)} + J_{w,i}\frac{\Delta L_i}{2H_i}e^{-\frac{(D_i L_i + K_i)}{2H_i}t} =$$

$$\left(-\frac{K_{w,i}\Delta L_i}{(D_i L_i + K_i)} + \frac{J_{w,i}\Delta L_i}{2H_i}\right)e^{-\frac{(D_i L_i + K_i)}{2H_i}t} + \frac{K_{w,i}\Delta L_i}{(D_i L_i + K_i)} \leq$$

$$\max\left\{\frac{K_{w,i}\Delta L_i}{(D_i L_i + K_i)}, \frac{J_{w,i}\Delta L_i}{2H_i}\right\} \leq \max\left\{K_{w,i}\Delta f_{max}, J_{w,i}\left(\frac{d\Delta f}{dt}\right)_{max}\right\}.$$

2.2.7) Substituting formula (36) into formula (17) to formula (19) to establish the security region constraints of the wind turbine generators, which are shown as formula (37) to formula (43) respectively.

$$K_w = 0; J_w = 0 \quad \omega_{r0} < \omega_{min} \quad (37)$$

$$K_{w,i}\Delta f_{max} \leq f_M(\omega_{min}) - K_{DL}\omega_{min}^3 \quad \omega_{rc} < \omega_{min} \quad (38)$$

$$J_{w,i}\left(\frac{d\Delta f}{dt}\right)_{max} \leq f_M(\omega_{min}) - K_{DL}\omega_{min}^3 \quad \omega_{rc} < \omega_{min} \quad (39)$$

$$K_{w,i}\Delta f_{max} \leq K_c\omega_{rc}^3 - K_{DL}\omega_{rc}^3 \quad \omega_{rc} \geq \omega_{min} \quad (40)$$

$$J_{w,i}\left(\frac{d\Delta f}{dt}\right)_{max} \leq K_c\omega_{rc}^3 - K_{DL}\omega_{rc}^3 \quad \omega_{rc} \geq \omega_{min} \quad (41)$$

$$K_{w,i}\Delta f_{max} \leq P_w^{max} - (1 - d_{w,i})P_{w,i} \quad (42)$$

$$J_{w,i}\left(\frac{d\Delta f}{dt}\right)_{max} \leq P_w^{max} - (1 - d_{w,i})P_{w,i} \quad (43)$$

3) Calculating the unit commitment model considering the wind turbine generators security region by using mixed-integer linear programming method, to obtain the operation result of the unit commitment considering the wind turbine generators security region with frequency response control.

Embodiment 1

An experiment to verify the unit commitment method considering the wind turbine generators security region with frequency response control, mainly comprises the following steps.

1) Taking the UK 2030 power system (GB 2030 power system) as test system. Information of the synchronous generator is shown in Table 1.

TABLE 1

Related parameters of the synchronous generator

| | nuclear power plant set | closed loop gas turbine | open loop gas turbine |
|---|---|---|---|
| number of units | 4 | 100 | 30 |
| rated capacity (MW) | 1800 | 500 | 100 |
| minimum output (MW) | 1400 | 250 | 50 |
| no-load cost $c_g^{nl}$ (£/h) | 0 | 4500 | 3000 |
| marginal cost $c_g^m$ (£/MWh) | 10 | 47 | 200 |
| start-up cost $c_g^{st}$ (£) | — | 10000 | 0 |
| duration time (h) | — | 4 | 4 |
| inertial time coefficient $H_g$ (s) | 5 | 4 | 4 |
| droop control parameters $K_{droop-g}$ | 0.2 | 0.2 | 0.2 |
| maximum one-time FM output | — | 10% | 10% |
| ramping rate (MW/h) | 360 | 100 | 20 |

The maximum and minimum load requirements of the system are 30 GW and 60 GW. The capacity of a single wind turbine generators is 1.5 MW, and the total wind power capacity of the system changes according to demand. In each case, the total wind power output accounts for about 35% of the load. The load damping parameter is set to D=0.5%/Hz. Considering the typical N−1 failure scenario, the maximum power fluctuation of the system is the push operation of the synchronous unit with the largest capacity $\Delta L_{max}$=1800 MW. The limit value of the frequency drop rate is $(d\Delta f/dt)_{max}$=0.5 Hz/s, and the lowest point of the frequency is $\Delta f_{nadir}$=0.5 Hz/s. The unit commitment is solved by gurobi.

2) Determining the Influence of Wind Turbine Generators Security Region on Unit Commitment.

Figure 2:
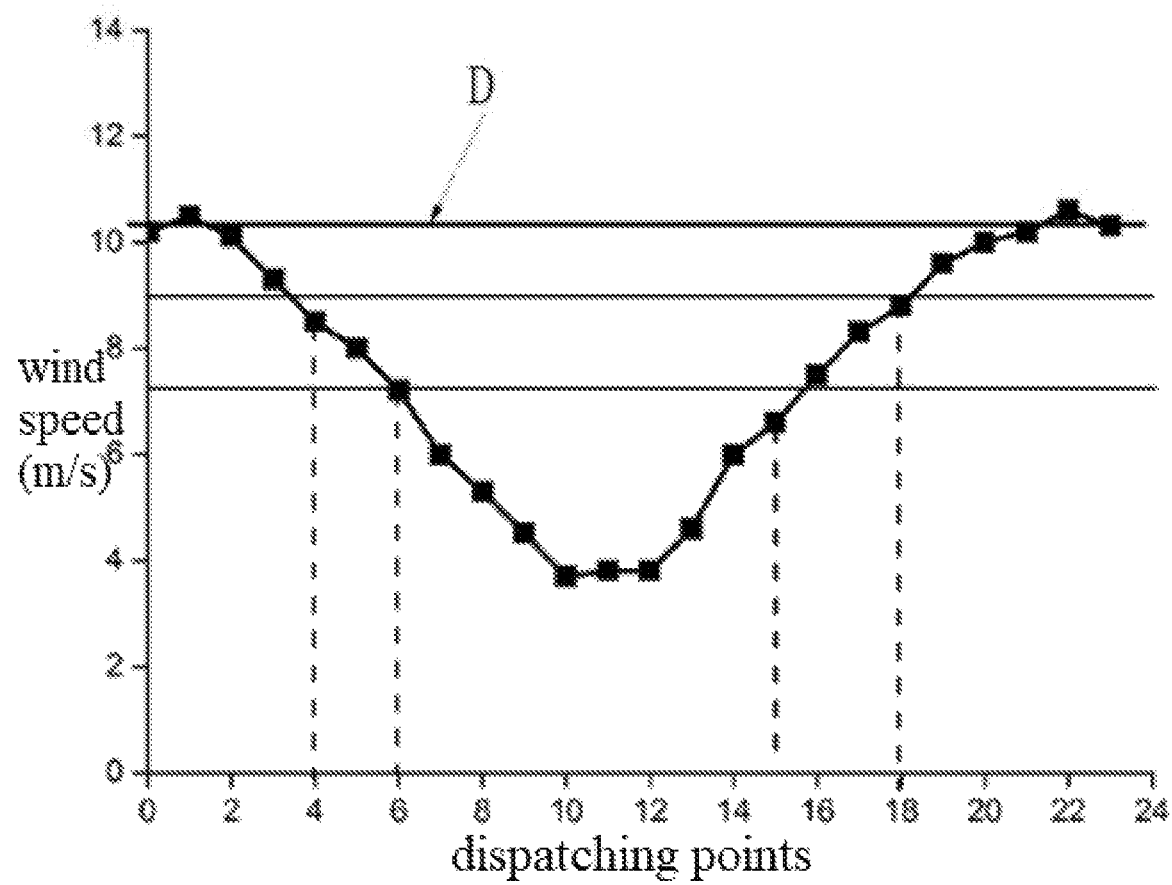
FIG. 2 is a schematic diagram of wind speed.

It can be seen from FIG. 1 that the security region of wind turbine generators changes with the changes of wind speed, and the security region has different effective constraints under different wind speeds. In this embodiment, the distribution of effective constraints at different wind speeds is shown in Table 2. In the FIG. 1, line A represents the rotor rotational speed constraints, line B represents the stability boundary constraints, and line C represents the output constraints. The wind speed is shown in FIG. 2, wherein line D represents the rated wind speed.

TABLE 2

Distribution of effective constraints at different wind speeds

| wind speed(m/s) | 7.2< | 7.2-9 | >9 |
|---|---|---|---|
| effective constraints | rotor rotational speed constraints | stability constraints | output constraint |

Therefore, the period of effective constraint distribution is as follows.

TABLE 3

Period distribution of effective constraints

| dispatch point | 6-15 | 4-6, 16-18 | 0-3, 19-23 |
|---|---|---|---|
| effective constraints | rotor rotational speed constraints | stability constraints | output constraints |

It can be seen from Table 2 and Table 3 that in the high wind speed section, the security region constraints are mainly determined by the output constraints. In the medium wind speed section, the security region constraints are mainly determined by the stability constraints. In the low wind speed section, the security region constraints are mainly determined by the rotor rotational speed constraints. The security region of the wind turbine generators when provides inertia response changes with the changes of wind speed. Therefore, the inertia response parameter of the wind turbine generators should not be set to a fixed value, but should be optimized in real time with changes of wind speed and system status.

Figure 3:
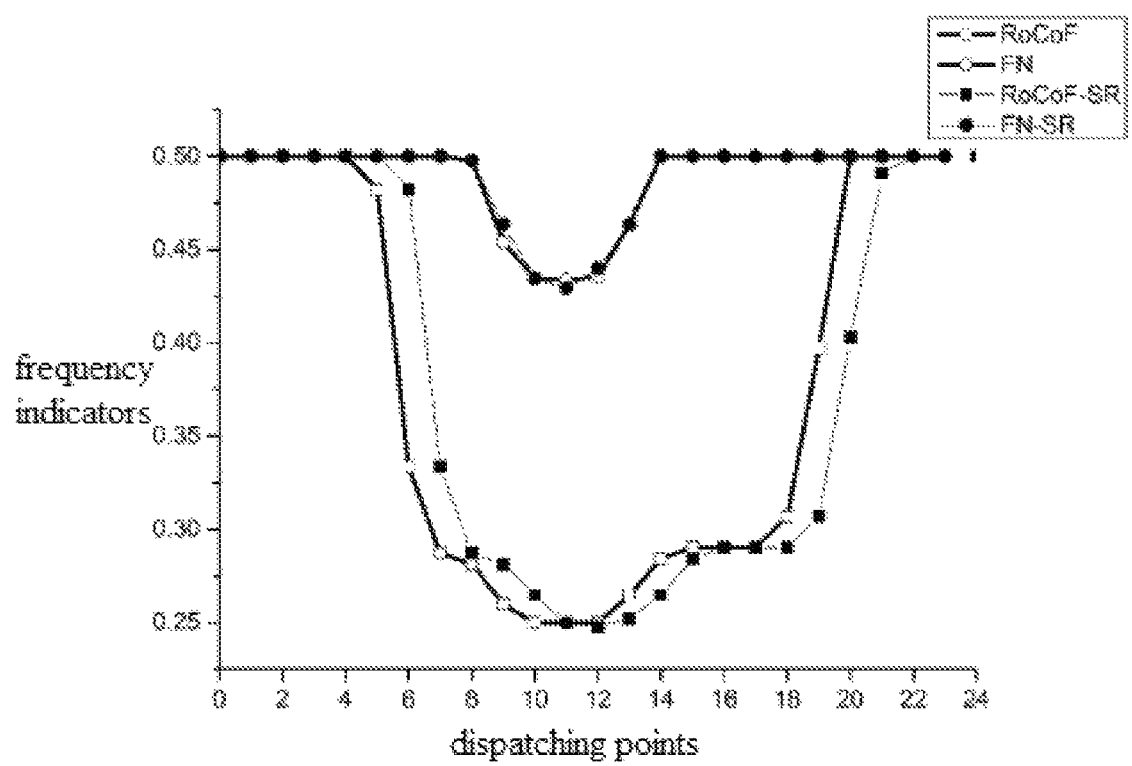
FIG. 3 is a schematic diagram of system frequency indicators.
Figure 4:
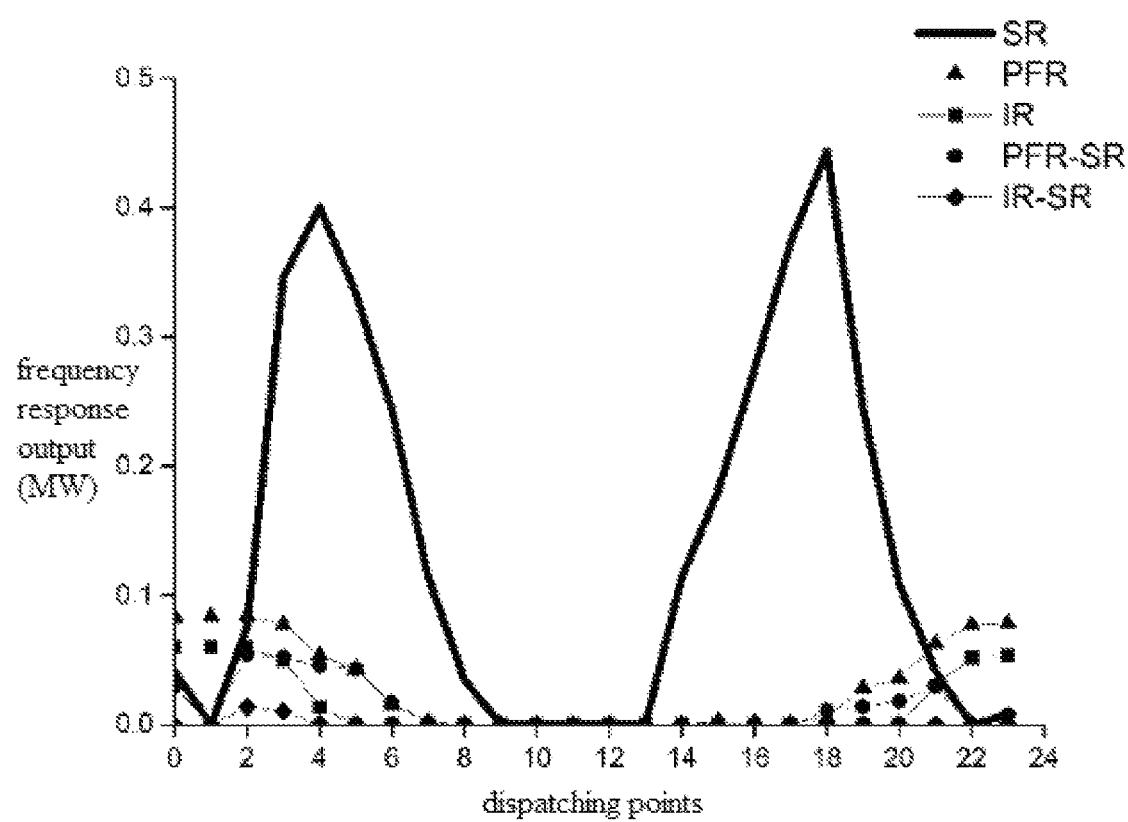
FIG. 4 is a schematic diagram of the influence of the security region of the wind turbine generators on the frequency response output of the wind turbine generators.

The system frequency indexes are shown in FIG. 3. RoCoF and FN are the system frequency conditions when the security region is not considered, and RoCoF-SR and FN-SR are the system frequency conditions when the security region is considered. It can be seen from FIG. 3 that the method provided by the present invention can meet the needs of system frequency stability. The frequency response output of wind turbine generators is shown in FIG. 4. Wherein, SR is the security region of the wind turbine generators when provides frequency response, PFR and IR respectively are the frequency response output of the wind turbine generators when the security region is not considered, and PFR-SR and IR-SR respectively are the frequency response output of the wind turbine generators when the security region is considered.

It can be seen from FIG. 3 that when the security region of wind turbine generators is not considered, the frequency response output of wind turbine generators at dispatching points 1-3 and 21-23 will exceed the security region of the wind turbine generators, which may cause the wind turbine generators cannot be safely and stably operated, or will overestimate the frequency response capability of the wind turbine generators and causes the frequency response output of the wind turbine generators cannot meet the system frequency requirements, and resulting system frequency becoming unstable. The method provided by the present invention can simultaneously meet the system frequency stability and the wind turbine generators security region requirements, and ensure the safe and stable operation of the system.

3) The Influence of Wind Turbine Generators Reserve Capacity on Frequency Response Output.

Figure 5:
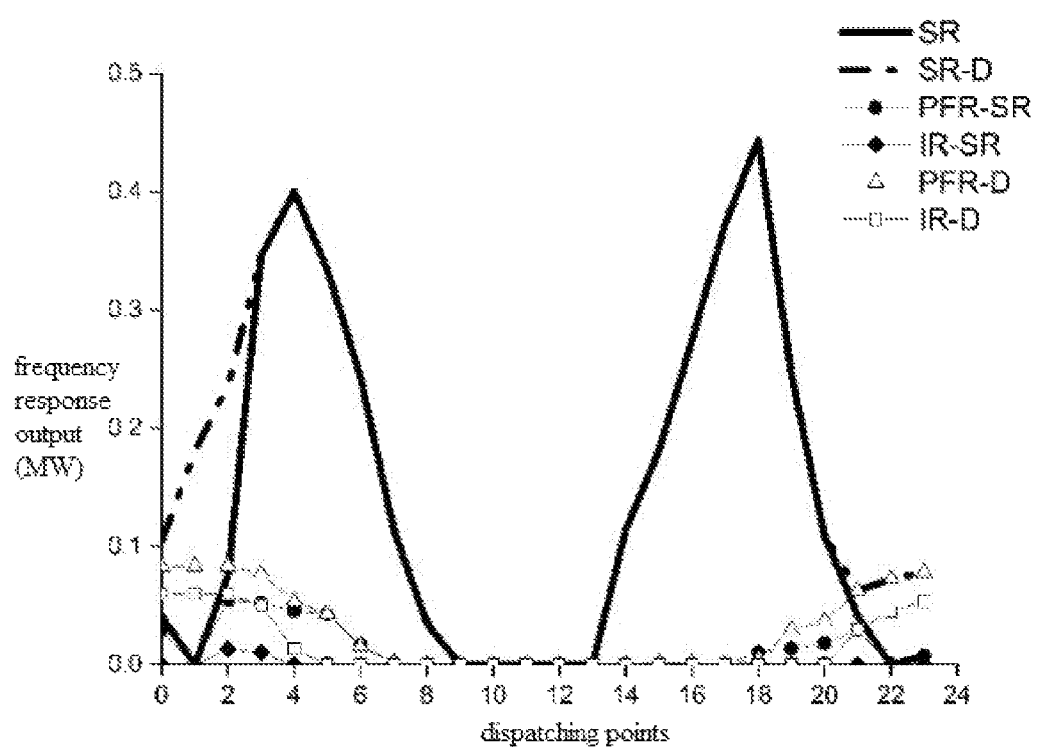
FIG. 5 is a schematic diagram of the influence of the reserve capacity of the wind turbine generators on the frequency response output of the wind turbine generators.

When considering the reserve capacity of wind turbine generators, its frequency response output is shown in FIG. 5. Wherein, SR-D is the security region constraints when considering the reserve capacity, and PFR-D and IR-D respectively are the frequency response output of the wind turbine generators when considering the reserve.

According to the analysis in the previous section, the main effective constraints of this embodiment are the output constraints of the wind turbine generators. Therefore, when the wind power has a certain amount of reserve capacity, it can effectively expand the security region of the wind turbine generators, thereby improving the ability of the wind turbine generators to provide frequency response.

To ensure the stability of the system frequency, when the wind turbine generators inertia response is insufficient, more synchronous generators need to be launched. Since the synchronous generators are restricted by minimum output and climbing constraints, the launch of a large number of synchronous generators will compress the penetration rate of wind turbine generators and cause a large amount of wind curtailment.

In this embodiment, the wind power utilization rate is shown in Table 4, and the wind power utilization rate unlisted dispatching points is 100%. At the dispatch points of 0-2 and 23, due to the influence of thermal power climbing constraints, it is impossible to fully balance the fluctuations of the wind turbine generators output, which results in partial wind power curtailment. During this time period, the curtailed wind can be fully utilized as a reserve. Other dispatching points need to sacrifice part of the wind power output as reserve capacity. It can be seen from Table 4 that after considering the reserve of wind turbine generators, although part of the wind power output is reduced, the security region of wind power is expanded, and the inertia response capability of wind turbine generators is enhanced, which reduces the pressure of synchronous generators to provide frequency response, thereby reducing the number of online synchronous power generator, and increasing the utilization rate of wind power output.

The method provided by the present invention can effectively optimize the wind power reserve capacity and fully guarantee the wind power utilization rate.

TABLE 4

Wind power utilization rate

| dispatching points | 0 | 1 | 2 | 3 | 4 | 19 | 21 | 22 | 23 |
|---|---|---|---|---|---|---|---|---|---|
| security region constraints are not considered | 95% | 88% | 88% | 100% | 100% | 100% | 100% | 100% | 98% |
| security region constraints are considered, and reserve is not considered | 52% | 22% | 64% | 77% | 91% | 97% | 81% | 42% | 41% |
| both security region constraints and reserve are considered | 95% | 88% | 88% | 100% | 100% | 100% | 98% | 95% | 95% |

From the experimental results, it can be seen that the unit commitment method considering the security region of wind turbine generators with frequency response control proposed by the present invention can ensure the safe operation of the wind turbine generators while meeting the needs of system frequency stability, and can make full use of the reserve capacity of the wind turbine generators to improve the ability of providing frequency response by the wind turbine generators, improve wind power utilization and reduce the wind curtailment.

In summary, the present invention proposes a unit commitment method considering both frequency stability and safe operation of wind turbine generators. Comprehensively considering the stability constraints, rotational speed constraints and output constraints of wind turbine generators, and the security region of wind turbine generators when provides frequency response is deduced. With the goal of minimizing the operating cost of synchronous generator, the system frequency stability constraints and wind turbine generators security region constraints are added to the traditional unit commitment model to achieve economic, stable and safe operation of the entire system. The study of the embodiment shows that the method provided by the present invention can effectively guarantee the stability of the system frequency and the safe operation of wind turbine generators. It can make full use of wind power resources by optimizing the reserve capacity of wind turbine generators, and can provide guidance to the set of frequency response parameters of wind turbine generators and the unit commitment considering high-penetration wind turbine generators.

The invention claimed is:

1. A unit commitment method considering a security region of wind turbine generators with frequency response control, mainly comprises the following steps:
   1) determining the security region of wind turbine generators when the wind turbine generators provide a frequency response;
   2) based on the security region of the wind turbine generators when the wind turbine generators provide the frequency response, establishing a unit commitment model considering the security region of the wind turbine generators; and
   3) calculating the unit commitment model considering the security region of the wind turbine generators by using mixed-integer linear programming method, and obtaining the operation result of the unit commitment considering the security region of the wind turbine generators with frequency response control;

wherein the main steps of determining security region of wind turbine generators when the wind turbine generators provide the frequency response are as follows:
   1) establishing an output model of wind turbine generators when the wind turbine generators provide the frequency response, namely:

$$\Delta P_w^{PFR} = K_w \Delta f \quad (1)$$

$$\Delta P_w^{IR} = J_w \frac{d\Delta f}{dt} \quad (2)$$

in the above formulas, $\Delta P_w^{PFR}$ and $\Delta P_w^{IR}$ respectively represent a primary frequency response and a virtual inertia response provided by the wind turbine generators; frequency response coefficient $K_w = 1/K_{droop-w}$; $K_{droop-w}$ is droop control parameter of the wind turbine generators in primary frequency response control; $J_w$ is virtual inertia control parameter of the wind turbine generators; $\Delta f$ is system frequency deviation, and t refers to time;

2) establishing constraint condition of rotor rotational speed $\omega_r$, namely:

$$\omega_{min} \leq \omega_r \leq \omega_{max} \quad (3)$$

in the above formulas, $\omega_{min}$ and $\omega_{max}$ respectively are the lowest speed and highest speed of the rotor rotational speed of the wind turbine generators;

3) establishing constraint conditions of wind power stability, and the main steps are as follows:
   3.1) determining synchronization characteristics of the wind turbine generators, namely:

$$P_E = K_{DL}\omega_r^3 - K_w\Delta f - J_w\frac{d\Delta f}{dt} \text{ and} \quad (4)$$

$$P_E = P_M = 0.5\rho\pi R^2 C_P(\beta, \lambda)v^3; \quad (5)$$

in the above formulas, $P_E$ is active output of the wind turbine generators; $K_{DL}$ is de-load factor of the wind turbine generators; when the wind turbine generators are working at maximum power tracking mode, coefficient $K_{DL}$ is the maximum power tracking coefficient, $K_{DL}\omega_r^3$ is the output of the wind turbine generators when there is no virtual inertia response; $\rho$ is air density; R is diameter of the rotor of the wind turbine generators; v is wind speed; $C_p$ is power coefficient of the wind turbine generators; $P_M$ is mechanical power of the wind turbine generators; and $\beta$ is pitch angle of the wind turbine generators;

wherein, the tip speed ratio $\lambda$ is shown as follows:

$$\lambda = \frac{R\omega_r}{v} \quad (6)$$

3.2) determining limit operating rotational speed $\omega_{rc}$ of the wind turbine generators, and the limit operating rotational speed $\omega_{rc}$ of the wind turbine generators meets the following formula:

$$\frac{\partial\left(K_{DL}\omega_r^3 - K_w\Delta f - J_w\frac{d\Delta f}{dt}\right)}{\partial\omega_r} = \frac{\partial\left(0.5\rho\pi R^2 C_P\left(\beta, \frac{R\omega_r}{v}\right)v^3\right)}{\partial\omega_r} \quad (7)$$

3.3) substituting the limit operating rotational speed $\omega_{rc}$ of the wind turbine generators into formula (5), and calculating to obtain limit operating point of the wind turbine generators $$\left(\omega_{rc}, 0.5\rho\pi R^2 C_P\left(\beta, \frac{R\omega_{rc}}{v}\right)v^3\right);$$

3.4) connecting extreme operating points at each wind speed to form stability boundary of the wind turbine generators, and substituting formula (6) into formula (7), and calculating limit tip speed ratio $\lambda_c$; and the limit tip speed ratio $\lambda_c$ meets the following formula:

$$3K_{DL}\left(\frac{\lambda v}{R}\right)^2 = 0.5\rho\pi R^2 \frac{\partial(C_P(\beta,\lambda))}{\partial \frac{\lambda v}{R}} v^3 = 0.5\rho\pi R^3 \frac{\partial(C_P(\beta,\lambda))}{\partial \lambda} v^2 \quad (8)$$

3.5) establishing expression formula of the relationship between wind speed and rotor rotational speed on the stability boundary of the wind turbine generators, namely:

$$v = \frac{R\omega_r}{\lambda_c}; \quad (9)$$

3.6) substituting formula (9) into formula (5), and calculating to obtain expression formula of the stability boundary of the wind turbine generators, namely:

$$P_c = \frac{0.5\rho\pi R^5 C_P(\beta,\lambda_c)}{\lambda_c^3}\omega_r^3 = K_c\omega_r^3 \quad (10)$$

3.7) based on formula (10), updating the limit operating point of the wind turbine generators to $(\omega_{rc}, K_c\omega_r^3)$;

3.8) establishing stability constraints of the wind turbine generators when the wind turbine generators provide the frequency response, and it is divided into the following three situations:

I) when the wind turbine generators are operating at the lowest speed, the wind turbine generators do not provide the frequency response, and the frequency response of the wind turbine generators is as follows:

$$-K_w\Delta f - J_w\frac{d\Delta f}{dt} = 0 \quad \omega_{r0} < \omega_{min} \quad (11)$$

in the above formulas, $\omega_{r0}$ is the rotor rotational speed in initial operating state of the wind turbine generators;

II) when the limit operating rotational speed $\omega_{rc}$ is less than the lowest speed $\omega_{min}$, the stability constraints of the wind turbine generators when the wind turbine generators provide the frequency response are as follows:

$$K_{DL}\omega_{min}^3 - K_w\Delta f - J_w\frac{d\Delta f}{dt} \leq f_M(\omega_{min}) \quad \omega_{rc} < \omega_{min} \quad (12)$$

in the above formulas, $f_M(\omega_{min})$ is the mechanical power of the wind turbine generators at the lowest rotational speed $\omega_{min}$;

III) when $\omega_{rc} \geq \omega_{min}$, the stability constraints of the wind turbine generators when the wind turbine generators provide the frequency response are as follows:

$$K_{DL}\omega_{rc}^3 - K_w\Delta f - J_w\frac{d\Delta f}{dt} \leq K_c\omega_{rc}^3 \quad (13)$$

4) establishing output constraints of the wind turbine generators when the wind turbine generators provide the frequency response, and the main steps are as follows:

4.1) updating the active output $P_E^*$ of the wind turbine generators, namely:

$$P_E^* = (1-d_w)P_w - K_w\Delta f - J_w\frac{d\Delta f}{dt}; \quad (14)$$

in the above formulas, $P_w$ is available power of the wind turbine generators; $d_w$ is reserve coefficient of the wind turbine generators, and $(1-d_w)P_w$ is actual output of the wind turbine generators when does not provide the frequency response output;

4.2) establishing output constraints of the wind turbine generators when the wind turbine generators provide the frequency response, namely:

$$(1-d_w)P_w - K_w\Delta f - J_w\frac{d\Delta f}{dt} \leq P_w^{max} \quad (15)$$

in the above formulas, $P_w^{max}$ is the maximum output of wind turbine generators;

5) combining formula (10), formula (12), formula (13) and formula (15), the security region of the wind turbine generators meets formula (16) to formula (19), namely:

$$K_w = 0; J_w = 0 \quad \omega_{r0} < \omega_{min}; \quad (16)$$

$$-K_w\Delta f - J_w\frac{d\Delta f}{dt} \leq f_M(\omega_{min}) - K_{DL}\omega_{min}^3 \quad \omega_{rc} < \omega_{min}; \quad (17)$$

$$-K_w\Delta f - J_w\frac{d\Delta f}{dt} \leq K_c\omega_{rc}^3 - K_{DL}\omega_{rc}^3 \quad \omega_{rc} \geq \omega_{min}; \text{ and} \quad (18)$$

$$-K_w\Delta f - J_w\frac{d\Delta f}{dt} \leq P_w^{max} - (1-d_w)P_w. \quad (19)$$

wherein the main steps of establishing a unit commitment model considering the security region of the wind turbine generators are as follows:

1) With the goal of minimizing the operating cost of the traditional synchronous generator, establishing the objective function, namely:

$$\min \sum_{i=1}^{T}\sum_{g\in\zeta}\left[(c_g P_{g,i} + c_g^{nl} N_{g,i}^{on})\Delta t + c_g^{su} N_{g,i}^{su}\right]; \quad (20)$$

in the above formulas, $\zeta$ is a set of traditional synchronous generators; $c_g$ is marginal cost; $c_g^{nl}$ is no-load cost; $c_g^{su}$ is start-up cost; $P_{g,i}$ is active power of the traditional synchronous generator; $N_{g,i}^{on}$ is online synchronous generator; $N_{g,i}^{su}$ is synchronous generator turned on at step i; T is total optimization time scale; $\Delta t$ is unit time interval; variables with the subscript i represent variables of the i-th step; variables with subscript g represent variables related to traditional synchronous generator g; variables with subscripts g,i represent related variables of the traditional synchronous generator g at the i-th step;

2) establishing constraints of traditional unit commitment, which include power flow constraints, synchronous generator constraints, system frequency stability constraints, frequency change rate constraints, frequency lowest point constraints, and wind turbine generators security region constraints;

2.1) power flow constraints are as follows:

$$\sum_{g \in \zeta} P_{g,i} + \sum_{w \in W}(1 - d_{w,i})P_{w,i} = L_i \quad i \in T \tag{21}$$

in the above formulas, W is a set of wind turbine generators; $L_i$ is total load of the system; the wind turbine generators parameters are all aggregate parameters; variables with subscript w represent variables related to wind turbine generators w; variables with subscripts w,i represent related variables of wind turbine generators w at step i;

2.2) synchronous generator constraints are shown in formula (22) to formula (28);

$$N_{g,i}^{on} P_g^{min} \le P_{g,i} \le N_{g,i}^{on} P_g^{max} \tag{22}$$

$$N_{g,i}^{on} = N_{g,i-1}^{on} + N_{g,i}^{su} - N_{g,i}^{sd} \tag{23}$$

$$N_{g,i}^{off} = N_{g,i-1}^{off} + N_{g,i}^{sd} - N_{g,i}^{su} \tag{24}$$

$$P_{g,i} - P_{g,i-1} \le \Delta P_g^{max} N_{g,i-1}^{on} + \Delta P_g^{su\ max}(N_{g,i}^{on} - N_{g,i-1}^{on}) \tag{25}$$

$$P_{g,i} - P_{g,i-1} \ge -\Delta P_g^{max} N_{g,i}^{on} + \Delta P_g^{sd\ max}(N_{g,i-1}^{on} - N_{g,i}^{on}) \tag{26}$$

$$\sum_{k=i+1-\Delta t_g^{up}}^{i} N_{g,k}^{su} \le N_{g,i}^{on} \tag{27}$$

$$\sum_{k=i+1-\Delta t_g^{dw}}^{i} N_{g,k}^{sd} \le N_{g,i}^{off} \tag{28}$$

in the above formulas, $P_g^{min}$ and $P_g^{max}$ are the minimum value and maximum value of the synchronous generator output, respectively; $\Delta P_g^{max}$ is the maximum value of output change of the synchronous generator; $\Delta P_g^{su\ max}$ and $\Delta P_g^{sd\ max}$ are the maximum upward and downward climbing power of the synchronous generator, respectively; $N_{g,i}^{sd}$ is the number of synchronous generators shut down in step i; $N_{g,i}^{off}$ is the number of synchronous generators offline at step i; $\Delta t_g^{up}$ and $\Delta t_g^{up}$ are the minimum start and stop time of the unit; i∈T; g∈ζ;

2.3) the system frequency stability constraints are as follows:

$$2H_i \frac{d\Delta f}{dt} + (D_i L_i + K_i)\Delta f = -\Delta L_i \tag{29}$$

wherein, $D_i$ is the load damping coefficient; $H_i$ is the system inertia time constant; $K_i$ is the frequency response coefficient;

wherein, the system inertia time constant $H_i$ is shown as follows:

$$H_i = \frac{\sum_{g \in \zeta} H_g P_g^{max} N_{g,i}^{on}}{f_0} + \pi \sum_{w \in W} J_{w,i} \tag{30}$$

in the above formulas, $H_g$ is the inertia time coefficient of synchronous generator; The optimized variables in formula (30) are the virtual inertia control parameters $J_{w,i}$ of the online synchronous generator $N_{g,i}^{on}$ and the wind turbine generators at i-th step; $f_0$ is the reference frequency of the power system;

frequency response coefficient $K_i$ is shown as follows:

$$K_i = \frac{\sum_{g \in \zeta} K_g P_g^{max} N_{g,i}^{on}}{f_0} + 2\pi \sum_{w \in W} K_{w,i} \tag{31}$$

in the above formulas, $K_g = 1/K_{droop-g}$; $K_{droop-g}$ is the droop control parameter of the synchronous generator; the optimized variables in formula (31) are the frequency response parameter $K_{w,i}$ of the online synchronous generator $N_{g,i}^{on}$ and the wind turbine generators at the i-th step;

system frequency deviation $\Delta f$ is shown as follows:

$$\Delta f(t) = \frac{\left(e^{-\frac{(D_i L_i + K_i)}{2H_i}t} - 1\right)\Delta L_i}{(D_i L_i + K_i)} \tag{32}$$

frequency change rate $d\Delta f/dt$ is shown as follows:

$$\frac{d\Delta f(t)}{dt} = -\frac{\Delta L_i}{2H_i} e^{-\frac{(D_i L_i + K_i)}{2H_i}t} \tag{33}$$

2.4) frequency change rate constraints are shown as follows:

$$\left|\left(\frac{d\Delta f(t)}{dt}\right)\right| \le \frac{\Delta L_i}{2H_i} \le \left(\frac{d\Delta f}{dt}\right)_{max} \tag{34}$$

2.5) frequency lowest point constraints are shown as follows:

$$|\Delta f(t)| \le |\Delta f_{nadir,i}| = \frac{\Delta L_i}{(D_i L_i + K_i)} \le \Delta f_{max} \tag{35}$$

2.6) Based on formula (1), formula (2), formula (32) to formula (35), establishing the equation of the frequency response provided by the wind turbine generators, namely:

$$\begin{aligned}
-K_{w,i}\Delta f(t) &- J_{w,i}\frac{d\Delta f(t)}{dt} \\
&= -K_{w,i}\frac{\left(e^{-\frac{(D_i L_i + K_i)}{2H_i}t} - 1\right)\Delta L_i}{(D_i L_i + K_i)} + J_{w,i}\frac{\Delta L_i}{2H_i}e^{-\frac{(D_i L_i + K_i)}{2H_i}t} \\
&= \left(-\frac{K_{w,i}\Delta L_i}{(D_i L_i + K_i)} + \frac{J_{w,i}\Delta L_i}{2H_i}\right)e^{-\frac{(D_i L_i + K_i)}{2H_i}t} + \frac{K_{w,i}\Delta L_i}{(D_i L_i + K_i)} \\
&\le \max\left\{\frac{K_{w,i}\Delta L_i}{(D_i L_i + K_i)}, \frac{J_{w,i}\Delta L_i}{2H_i}\right\} \\
&\le \max\left\{K_{w,i}\Delta f_{max}, J_{w,i}\left(\frac{d\Delta f}{dt}\right)_{max}\right\};
\end{aligned} \tag{36}$$

2.7) substituting formula (36) into formula (17) to formula (19) to establish the security region constraints of the wind turbine generators, which are shown as formula (37) to formula (43) respectively:

$$K_w = 0; J_w = 0 \quad \omega_{r0} < \omega_{min} \tag{37}$$

$$K_{w,i}\Delta f_{max} \leq f_M(\omega_{min}) - K_{DL}\omega_{min}^3 \quad \omega_{rc} < \omega_{min} \tag{38}$$

$$J_{w,i}\left(\frac{d\Delta f}{dt}\right)_{max} \leq f_M(\omega_{min}) - K_{DL}\omega_{min}^3 \quad \omega_{rc} < \omega_{min} \tag{39}$$

$$K_{w,i}\Delta f_{max} \leq K_c\omega_{rc}^3 - K_{DL}\omega_{rc}^3 \quad \omega_{rc} \geq \omega_{min} \tag{40}$$

$$J_{w,i}\left(\frac{d\Delta f}{dt}\right)_{max} \leq K_c\omega_{rc}^3 - K_{DL}\omega_{rc}^3 \quad \omega_{rc} \geq \omega_{min} \tag{41}$$

$$K_{w,i}\Delta f_{max} \leq P_w^{max} - (1 - d_{w,i})P_{w,i} \tag{42}$$

$$J_{w,i}\left(\frac{d\Delta f}{dt}\right)_{max} \leq P_w^{max} - (1 - d_{w,i})P_{w,i}; \tag{43}$$

wherein frequency response control parameters of the wind turbine generators are set based on the security region of the wind turbine generators when the wind turbine generators provide the frequency response.

* * * * *